United States Patent [19]

Garrett et al.

[11] 3,775,677
[45] Nov. 27, 1973

[54] FLASHLIGHT-CONTINUITY TESTER HAVING PLUG AND JACK ARRANGEMENT

[76] Inventors: David C. Garrett, 105 Lakeview Dr., R.R. No. 2, Blairsville, Pa. 15717; Harold W. Reick, 7535 Woodvale, S.E., Grand Rapids, Mich. 49508

[22] Filed: June 15, 1972

[21] Appl. No.: 263,307

[52] U.S. Cl. .................................................. 324/53
[51] Int. Cl. .............................................. G01r 31/02
[58] Field of Search .............................. 324/53, 72.5

[56] References Cited
UNITED STATES PATENTS

| | | | |
|---|---|---|---|
| 1,887,421 | 11/1932 | Newman | 324/72.5 UX |
| 2,302,248 | 11/1942 | Olson | 324/53 |
| 2,687,508 | 8/1954 | Noyes | 324/53 |
| 2,703,385 | 3/1955 | Curd | 324/53 |
| 2,832,930 | 4/1958 | Hays | 324/53 |
| 2,846,644 | 8/1958 | Costello | 324/53 |
| 2,899,638 | 8/1959 | Olson | 324/53 |
| 3,634,680 | 1/1972 | Myrah | 324/53 X |

*Primary Examiner*—Gerard R. Strecker
*Attorney*—Harold W. Reick

[57] ABSTRACT

A continuity tester includes circuit interruption means coupled in series with the electrical circuit of a flashlight. A pair of continuity testing leads is connected to the interruption means by a plug to which the leads are coupled and a switch-including jack positioned on the flashlight and coupled to the interruption means. When the continuity leads are disconnected by removing the plug, the jack switch electrically bypasses the interruption means and the flashlight can be operated in a normal fashion. When the leads are connected by inserting the plug into the jack, the jack switch changes position and the flashlight can be lighted only when electrical continuity exists between the test leads.

9 Claims, 4 Drawing Figures 3,775,677

FLASHLIGHT-CONTINUITY TESTER HAVING PLUG AND JACK ARRANGEMENT

BACKGROUND OF THE INVENTION

The present invention relates to an electrical continuity tester which is combined with a flashlight.

Frequently, a continuity tester is needed for testing electrical circuits, fuses, bulbs, or other electrical equipment. In some instances, when for example, testing a fuse which has blown out, it is necessary to provide light to the fuse box area darkened by the loss of electricity due to the blown fuse. Frequently also, a continuity tester must be used in other areas requiring light.

By combining a continuity tester with a flashlight therefore, the need for light, as well as continuity testing apparatus is met. Also, a flashlight provides a convenient and portable source of electrical current and a lamp which can be used as a continuity light. Several devices have been proposed to provide a combined continuity tester and flashlight. Of these, U.S. Pat. Nos. 2,742,607 issued Apr. 17, 1956, to J. P. Ryan and 2,899,638 issued Aug. 11, 1959, to A. V. Olson are representative. These devices either employ a separate light for the continuity testing and utilize only the batteries of the flashlight, or employ a relatively complex structure which is generally usable with only one type of flashlight (i.e., one with only an insulated case or one with a metal case) which is specially manufactured for the continuity tester.

Some proposed devices employ continuity test leads which plug into a flashlight but the jack on the flashlight performs no switching function and no unique circuit interrupter is used. One device provides an extension light with a bulb (separate from the flashlight bulb) coupled to a plug which is inserted into a switch-including jack on a flashlight.

SUMMARY OF THE INVENTION

None of the known prior devices however, incorporate a switch-including jack for a continuity tester or circuit interruption means which can be universally used with flashlights having conducting or insulating cases and flashlights with or without removable end caps.

In addition to providing a combined continuity tester/flashlight, a broader aspect of the present invention includes structure which can be employed to modify existing flashlights thereby converting them to dual function units.

It is an object therefore of the present invention to provide an improved continuity tester/flashlight.

An additional object of the present invention is to provide a continuity tester/flashlight with a switch-including jack for converting the flashlight to a continuity tester when the continuity test leads are plugged into the jack, but which permits normal operation of the flashlight when the leads are removed.

Another object of the present invention is to provide an improved and simplified circuit interruption means universally usable with conducting and insulated flashlight cases.

Still an additional object of the present invention is to provide apparatus for converting a flashlight into a combined continuity tester/flashlight.

These and other objects of the present invention will become apparent upon reading the following specification together with the accompanying drawings.

DETAILED DESCRIPTION OF THE PREFERRED EMBODIMENT

Figure 1:
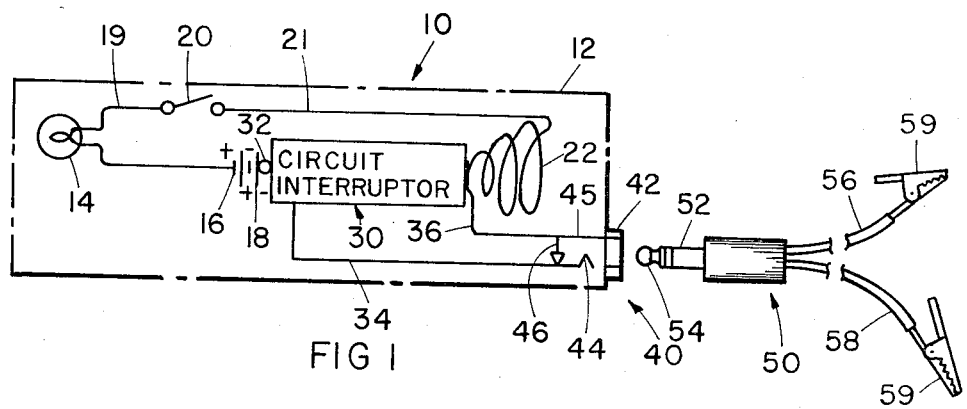
FIG. 1 is a circuit diagram partially in schematic, pictorial, and block form showing a continuity tester embodying the present invention.

Referring now to FIG. 1, there is shown a continuity tester 10 which is incorporated into a flashlight having an insulated or conducting case 12 represented in the figure by the dashed lines. The continuity tester includes the normal lamp 14 of the flashlight together with a pair of batteries 16 and 18 which are coupled in series with the positive terminal of battery 16 coupled to one terminal of the lamp. The remaining terminal of lamp 14 is coupled to one terminal of a thumb switch 20 by means of a conductor 19. The remaining terminal of switch 20 is electrically coupled to a conducting bias spring 22 by means of a conductor 21 which, in a flashlight with a metal case, can be the case itself. Normally, the circuit for the flashlight is completed by the connection of the negative terminal of battery 18 to the bias spring 22.

In the continuity tester however, a circuit interrupter 30 is physically and electrically interposed in series between the rear of negative terminal of battery 18 and the bias spring 22 to electrically insulate the battery from the bias spring thereby interrupting the circuit. The interrupter could also be coupled between the batteries or between battery 16 and lamp 14. Interrupter 30 includes an input electrical contact 32 coupled to the battery 18 and at least one output lead 34 electrically coupled to terminal 32.

Lead 34 is also coupled to a switch-including jack 40 which is mounted on the flashlight case at a suitable location and which includes an outer contact 42, a center contact 44 and a switching contact 46. In the embodiment shown, a conductor 45 couples the outer contact 42 to the switching contact 46 while lead 34 of the interrupter is coupled to center contact 44. A conductor 36 couples contacts 42 and 46 to conductor 21 through the bias spring 22 or if the interrupter is placed elsewhere in the circuit, to the circuit element which is physically in contact with the rear of the interrupter (i.e., opposite terminal 32).

Employed with the continuity tester of the present invention is a suitable plug 50 which is adapted to fit within jack 40 and includes an outer or barrel contact 52 which electrically contacts the outer contact 42 of the jack and an end contact 54 which electrically contacts the center contact 44 of the jack. When the plug is inserted into the jack it opens the normally closed switching contact between contacts 44 and 46.

A pair of test leads 56 and 58 each include alligator clips or suitable electrical probes 59 at one end thereof and have their opposite ends coupled to one of the contacts 52 or 54. When the plug 50 is inserted into jack 40 and switch 20 of the flashlight is actuated, the leads 56 and 58 serve as continuity test leads which will allow lamp 14 to actuate only when electrical continuity exists between the leads. When the plug 50 is removed from the continuity tester 10, switch contact 46 electrically contacts the center contact 44 thereby coupling terminal 32 of the circuit interrupter to the bias spring 22 such that the flashlight can operate normally.

Figure 2:
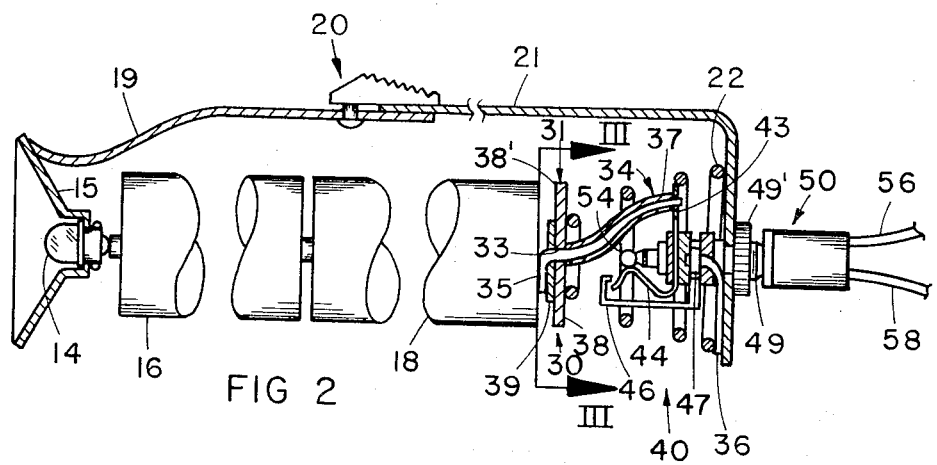
FIG. 2 is a fragmentary side elevational view partially in cross section of the continuity tester shown in FIG. 1.
Figure 3:
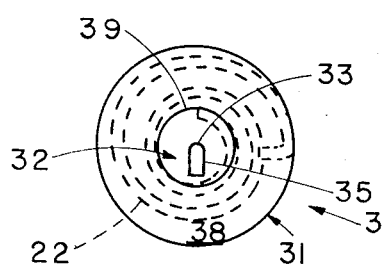
FIG. 3 is a slightly enlarged front elevation view of a portion of the apparatus shown in FIG. 2 taken along the lines III—III.
Figure 4:
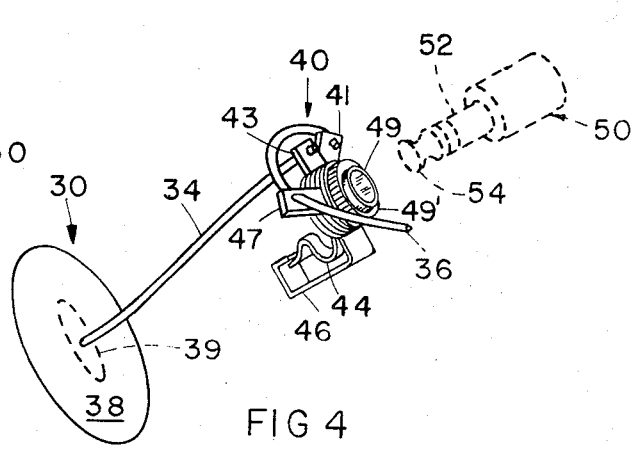
FIG. 4 is a perspective view of a conversion kit for converting a conventional flashlight to a continuity tester in accordance with the principles of the present invention.

Referring now to FIGS. 2, 3 and 4, which show the details of a circuit interrupter which can be employed, it is initially noted that jack 40 is a sub-miniature phone jack of the type frequently employed in portable transistor radios. In FIG. 2, jack 40 and plug 50 are shown approximately three times life size for clarity while the remaining components are slightly less than life size.

The circuit interrupter 30 comprises a disc of insulating material 31 which can be paperboard, plastic or any other suitable insulating material. Disc 31 has a diameter substantially the same as the diameter of the cylindrical batteries 16, 18 and includes an aperture 33 formed through the central portion. Extending through aperture 33 is an end 35 of the output conductor 34. Conductor 34 has an insulated jacket 37 which covers the conductor from its junction with the rear surface 38 of disc 31 to its electrical connection with jack terminal 43 electrically coupled to the center contact 44 of jack 40. End 35 is extended through a snugly fitted conducting washer 39 positioned against the front surface 38' of disc 31 and is bent over the washer to form a physically secure contact. In some embodiments, the end 35 of conductor 34 can be soldered to washer 39 to form the input contact 32 for the circuit interrupter. In other embodiments, it may be possible to eliminate washer 39 and simply bend the end of conductor 34 against the disc 31.

The switching contact 46 of jack 40 includes a terminal 47, while outer contact 42 includes an electrical terminal 41. Insulating members 48 (shaded in FIG. 2) insulate the various contacts and terminals of the jack.

Conductor 36 is soldered to terminal 41, to terminal 47, and has a free end which can be fitted under spring 22 to be held in contact with conductor 21 of the flashlight as seen in FIG. 2. Conductor 36 could also be positioned between the rear surface 38 of interrupter 30 and spring 22 or otherwise electrically coupled to the spring or conductor 21. In metal case flashlights, conductor 21 is the case, while with insulated flashlights, a conducting strip is provided to make the electrical connection between the spring 22 and the switch 20. In the embodiment shown, switch 20 moves a conducting strip 19 into and out of contact with a conductive lamp reflector 15 which is coupled to one of the terminals of lamp 14. In other embodiments, various other conventional switching arrangements can be employed.

Nearly any conventional flashlight can be converted into the continuity tester of the type described and claimed herein by employing the conversion kit shown in FIG. 4 including the circuit interrupter, jack and plug. To modify a conventional cylindrical flashlight, it is necessary only to drill a jack-receiving aperture preferably centrally in the rear end of the flashlight such that the bias spring 22 will clear the jack once installed. The jack is then threaded through the bias spring with conductor 36 between the spring and the rear of the case and the jack fitted into the aperture. To facilitate installation the bias spring can be removed from the light and reinstalled with the conversion kit fitted therethrough. The jack is secured to the light by threading the knurled nut 49' onto the threaded end 49 of the jack. When installed, the spring 22 pushes against rear surface 38 of circuit interrupter 30 to hold the contact 32 against the negative terminal of battery 18. A lantern type of flashlight can be converted by positioning the jack at any accessible area within the light and coupling terminal 43 and interconnected terminals 41 and 47 in series with one of the switch leads generally present.

In use, the switch 20 of the continuity tester is moved to the on position once plug 50 is inserted into jack 40. Clips 59 are coupled to the circuit points under check. If continuity exists, lamp 14 will illuminate. When plug 50 is removed, the unit operates as a normal flashlight since the jack 40 electrically bypasses the circuit interrupter. In some units where space permits, a miniature phone jack and plug can replace the sub-miniature combination. These and other variations of the preferred embodiment will become apparent to those skilled in the art and will fall within the spirit and scope of the present invention as defined by the appended claims.

What is claimed is:

1. A continuity tester comprising a flashlight including a lamp, a battery, and circuit means including a bias spring contacting one terminal of said battery for selectively coupling said lamp in circuit with said source to illuminate said lamp, wherein the improvement comprises:

an insulating member positioned between said one battery terminal and said bias spring, a conductor coupled to said insulating member to define, at least in part, an electrical contact on a surface of said insulating member adjacent said battery to couple said one battery terminal to said conductor;

a switch-including jack positioned on said flashlight and having first and second jack contacts one jack contact of which is coupled to said conductor on said insulating member, the remaining jack contact of which is electrically coupled to said circuit means of said flashlight on the side of said insulating member opposite said contact, and a switching contact coupled between said first and second jack contacts; and a plug adapted to fit in said jack and including a pair of contacts which contact said first and second jack contacts and a pair of continuity test leads coupled to said pair of plug contacts wherein said switching contact is selectively actuated by the insertion and removal of said plug into said jack to bypass said insulating member when said plug is removed, and to bypass said interruption means when the plug is inserted into said jack and electrical continuity exists between said continuity test leads.

2. A continuity tester comprising a flashlight including a lamp, at least one battery having a pair of electrical terminals, and circuit means selectively coupling said lamp in circuit with said battery to illuminate said lamp, wherein the improvement comprises:

circuit interruption means comprising a disc of insulating material having an aperture formed therethrough and a conductor having one end extending through said aperture to provide an electrical contact on one side of said disc, said disc positioned between one of said terminals of said battery and associated circuit means normally in contact with said one battery terminal;

a switch-including jack positioned on said flashlight and having first and second contacts electrically coupled to said circuit means of said flashlight on opposite sides of said circuit interruption means with one of said contacts coupled to said conductor extending from said disc;

a switching contact coupled between said first and second contacts of said switch-including jack; and a plug adapted to fit in said jack and including a pair of contacts which contact said first and second contacts of said jack and a pair of continuity test leads coupled to said pair of plug contacts when said switching contact is selectively actuated by the insertion and removal of said plug into said jack to bypass said circuit interruption means when said plug is removed, and to bypass said interruption means when the plug is inserted into said jack and electrical continuity exists between said continuity test leads.

3. The continuity tester as defined in claim 2 wherein said remaining contact of said jack is electrically coupled to the circuit element in contact with an opposite surface of said disc.

4. The continuity tester as defined in claim 3 wherein said jack comprises a sub-miniature phone jack positioned on one end of the case of the flashlight.

5. A conversion kit for converting a conventional flashlight including a bias spring contacting one terminal of a battery fitted therein to a combined continuity tester/flashlight comprising:

a switch-including jack having first and second contacts adapted to contact first and second contacts of a plug associated with said jack, said jack further including a switching contact coupled between said first and second contacts and selectively actuated by the insertion and removal of said plug therein to alternately uncouple and couple said first and second jack contacts respectively;

an insulating member shaped to be fitted into a flashlight between one terminal of a battery and the bias spring normally contacting said one terminal and including an electrical contact on a surface adjacent the battery terminal to contact the terminal when the kit is installed in a flashlight; and conducting means coupled from said contact on said insulating member to one of said first or second contacts of said jack whereby the remaining jack contact is adapted to be coupled in circuit with the flashlight when said kit is installed therein to electrically bypass said insulating member when said switching contact of said jack is closed to short said first and second jack contacts.

6. A conversion kit for converting a conventional flashlight to a combined continuity tester/flashlight comprising:

a switch-including jack having first and second contacts adapted to contact first and second contacts of a plug associated with said jack, said jack further including a switching contact coupled between said first and second contacts and selectively actuated by the insertion and removal of said plug therein to alternately uncouple and couple said first and second jack contacts respectively; and means for coupling said first and second jack contacts in series with the electrical circuit of a flashlight comprises a disc of insulating material having an aperture therein and adapted to be positioned in contact with one terminal of a battery of said flashlight and having an electrical conductor with one end extending through said aperture to form an electrical contact on one side of said disc, said opposite end of said conductor coupled to one of said contacts of said jack, the remaining contact of said jack including conducting means thereon adapted to be coupled to a circuit element contacting a surface of said insulating disc opposite said electrical contact thereon.

7. The continuity tester as defined in claim 6 and further including a plug adapted to fit in said jack and having first and second contacts which electrically contact said contacts of said jack and further including a pair of continuity test leads coupled to said contacts and extending from said plug.

8. A continuity tester comprising:

a flashlight including a battery-containing case having a conducting bias spring at one end thereof to position one or more batteries in electrical contact with a lamp positioned at an opposite end thereof;

an insulating member having first and second opposed surfaces and positioned between said bias spring and a battery when positioned in said case to interrupt the electrical circuit therebetween;

a plug including first and second contacts and a pair of continuity test leads coupled to said contacts and extending from said plug;

a switch-including jack adapted to receive said plug and having first and second contacts which contact said plug contacts and which are electrically shorted when said plug is not inserted therein.

a first conductor extending from one of said jack contacts to one of said surfaces of said insulating member to form an electrical contact with a battery when positioned in said case; and conducting means extending from the other of said jack contacts and coupled to said bias spring.

9. The continuity tester as defined in claim 8 wherein said insulating member comprises a disc having an aperture therein and wherein said first conductor has an end extending through said aperture to form an electrical contact at one of the surfaces of said disc.

* * * * *